(12) United States Patent
Bedwell et al.

(10) Patent No.: US 7,812,932 B2
(45) Date of Patent: Oct. 12, 2010

(54) UNIVERSAL LASER RANGE EVALUATION AND VERIFICATION SYSTEM

(75) Inventors: Larry G. Bedwell, Dugger, IN (US); Michael E. Zimmer, Springville, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 262 days.

(21) Appl. No.: 12/247,742

(22) Filed: Oct. 8, 2008

(65) Prior Publication Data

US 2010/0085556 A1    Apr. 8, 2010

(51) Int. Cl.
*G01C 3/08* (2006.01)

(52) U.S. Cl. .................. 356/4.02; 356/3.01; 356/3.1; 356/4.01; 356/4.04

(58) Field of Classification Search ....... 356/3.01–3.15, 356/4.01–4.1, 5.01–5.15, 6–22, 28, 28.5
See application file for complete search history.

(56) References Cited

U.S. PATENT DOCUMENTS

| | | | |
|---|---|---|---|
| 3,752,587 A | 8/1973 | Myers et al. | |
| 4,068,952 A * | 1/1978 | Erbert et al. | 356/4.02 |
| 4,121,890 A * | 10/1978 | Braun | 356/4.02 |
| 4,155,096 A | 5/1979 | Thomas et al. | |
| 4,422,758 A | 12/1983 | Godfrey et al. | |
| 4,432,640 A | 2/1984 | Grage et al. | |
| 4,569,591 A | 2/1986 | Ford et al. | |
| 4,772,122 A | 9/1988 | Kasner | |
| 5,009,502 A | 4/1991 | Shih et al. | |
| 5,629,767 A * | 5/1997 | Tchejeyan | 356/153 |
| 6,765,663 B2 | 7/2004 | Byren et al. | |

FOREIGN PATENT DOCUMENTS

EP     0 117 983     11/1991

* cited by examiner

*Primary Examiner*—Thomas H Tarcza
*Assistant Examiner*—Luke D Ratcliffe
(74) *Attorney, Agent, or Firm*—Christopher A. Monsey

(57) ABSTRACT

A test station for testing a laser range finder is disclosed. The test station may be a mobile test station. The test station may include an optical system having a first portion which aligns an eyepiece of the test station to the laser range finder, a second portion which aligns the eyepiece to a first range target spaced apart from the test station, and a third portion which aligns the laser range finder to the first range target.

23 Claims, 15 Drawing Sheets

UNIVERSAL LASER RANGE EVALUATION AND VERIFICATION SYSTEM

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon.

BACKGROUND OF THE INVENTION

The present invention relates generally to devices for testing laser range finder devices and, more particularly, to devices for testing laser range finder devices in a spaced apart relationship to the intended position of the laser range finder device which is often internal to an overall system.

Laser range finders may be used in various applications to determine the distance to an object. For instance, laser range finders may be used as a part of a firing system for a missile. One exemplary laser range finder is the Bradley Eye-Safe Laser Range Finder (BELRF) which is associated with the Bradley A2 fighting vehicle of the US military and is apart of the fire control system of the vehicle. The BELRF is included within an integrated sight unit (ISU) which also includes additional components.

At times, laser range finders will need to be repaired. For laser range finders incorporated in an overall system, the laser range finder is disassembled from the overall system, repaired, and reassembled to the overall system for testing. Such is the traditional route for testing a repaired BELRF for accurate distance determination. The BELRF is assembled into an ISU for testing at a testing facility and then removed and sent to its ultimate destination for assembly into another ISU (assuming the BELRF passed the testing) or removed and sent back for further repair (assuming the BELRF failed the testing).

This assembly into an ISU unit for testing followed by subsequent removal presents many challenges. First, the assembly and removal of the BELRF to/from the ISU requires many connections to be made in tight spatial constraints. This requires time. Second, repeated assembly and removal of the BELRF to/from the ISU may result in components of the ISU failing.

SUMMARY OF THE INVENTION

According to an exemplary embodiment of the present disclosure, a test station is provided for testing a laser range finder.

In another exemplary embodiment of the present disclosure, a test station for testing an ability of a laser range finder to determine a distance to a first range target is provided. The test station comprising a frame, a holder supported by the frame, an eyepiece supported by the frame, and an optical system supported by the frame. The holder supporting a laser range finder being tested. The laser range finder having an alignment source and a range source aligned to the alignment source. The optical system including a first portion which aligns the eyepiece with the alignment source of the laser range finder, a second portion which aligns the eyepiece with the first range target which is spaced apart from the test station, and a third portion which aligns the range source of the laser range finder with the first range target.

BRIEF DESCRIPTION OF THE DRAWINGS

The foregoing aspects and many of the attendant advantages of this invention will become more readily appreciated as the same become better understood by reference to the following detailed description when taken in conjunction with the accompanying drawings.

Figure 1:
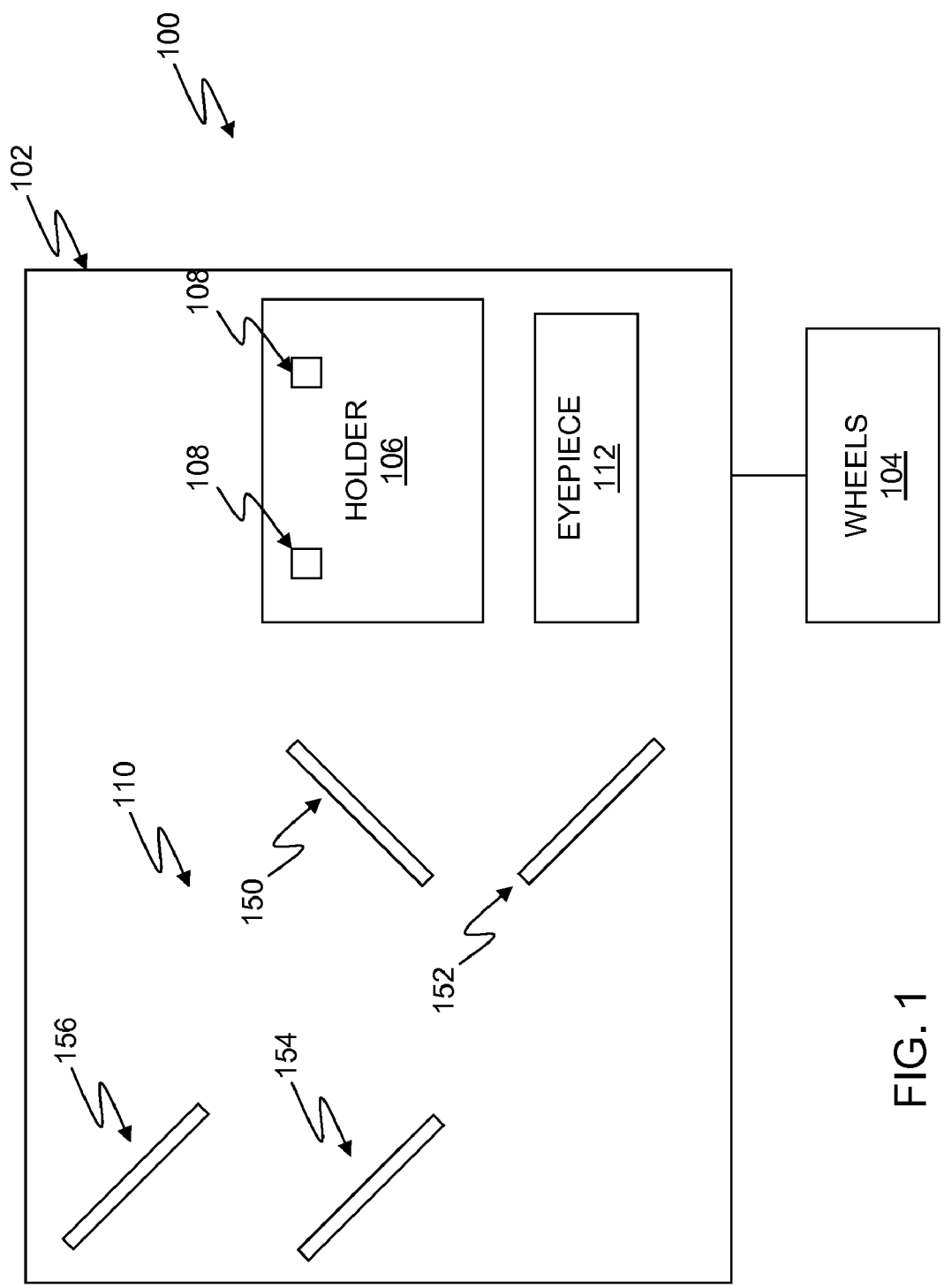
FIG. 1 is a representative view of an embodiment of a test station for testing a laser range finder.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure.

The exemplification set out herein illustrates embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrated devices and described methods and further applications of the principles of the invention which would normally occur to one skilled in the art to which the invention relates.

Referring initially to FIG. 1, a test station 100 is shown. Test station 100 is used for testing laser range finders 200 (see FIG. 2), such as the BELRF unit. Referring to FIG. 1, test station 100 includes a frame 102. In one embodiment, frame 102 is a stationary frame. In one embodiment, frame 102 is a moveable frame and is supported by a plurality of wheels 104. Wheels permit the movement of frame 102 so that the laser range finder being tested may be moved to various testing areas.

In one embodiment, frame 102 includes a support plate having a plurality of mounting holes for assembly of mirror mounts and other components. An exemplary support plate is the SA Series Solid Aluminum Plates available from Newport Corporation located at 1791 Deere Avenue, Irvine, Calif. 92606.

A holder 106 is supported by frame 102. Holder 106 includes locators 108 which assist in coupling a laser range finder to holder 106. Exemplary locators include a hole for receiving a guide pin coupled to a housing of the laser range finder or a guide pin for being received in a hole in a housing of the laser range finder.

Test station 100 further includes an optical system 110 and an eyepiece 112. Optical system 110 is used to align a laser range finder 200 (see FIG. 2) being tested to the eyepiece 112, to align the eyepiece 112 to a range target 170 (see FIG. 6), and to align the laser range finder 200 being tested to the range target 170. The operation of optical system 110 is explained herein.

Figure 3A:
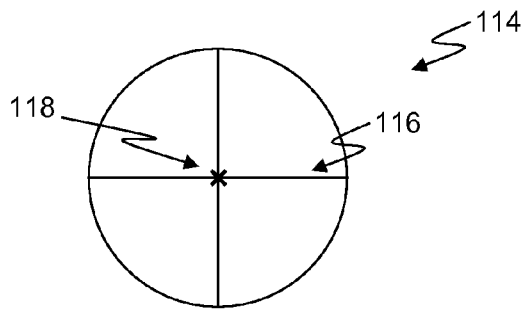
FIGS. 3A-3C are exemplary eyepieces of the test station of FIG. 1.

Eyepiece 112 provides an operator with an indication of the alignment of various components, such as the laser range finder 200 and range target 170. A first exemplary eyepiece is a reticule 114, represented in FIG. 3A. Reticule 114 includes a cross-hairs 116 which define an optical axis 118 of optical system 110.

Figure 3B:
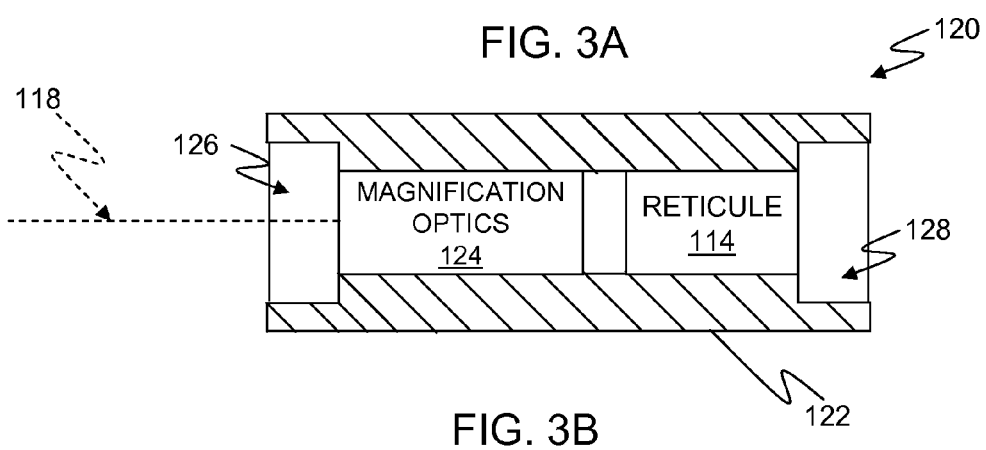

Referring to FIG. 3B, a second exemplary eyepiece, a scope 120, is shown. Scope 120 includes a housing 122. Within housing 122 is a set of magnification optics 124 which may be used to change the magnification of light entering a front window 126 of housing 122. Housing 122 also includes a reticule 114. A user or a camera may observe reticule 114 through an exit window 128 in housing 122.

Figure 3C:
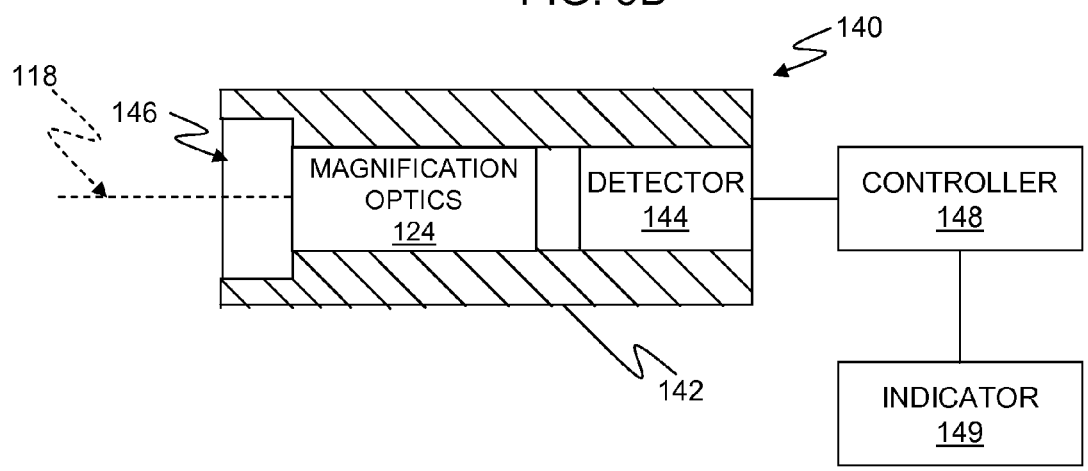

Referring to FIG. 3C, a third exemplary eyepiece, a camera 140, is shown. Camera 140 includes a housing 142. Within housing 142 is a set of magnification optics 124 which may be used to change the magnification of light entering a front window 146 of housing 142. Housing 142 also includes a detector 144. In one embodiment, detector 144 is located to image a reticule 114 positioned between magnification optics 124 and detector 144. In another embodiment, detector 144 is located to image light entering front window 146. In one example, a virtual reticule is provided through software associated with detector 144.

In one embodiment, detector 144 is operatively coupled to a controller 148 which analyzes the images captured by detector 144 and provides an indication to an operator of the images with an indicator 149. In one embodiment, the indicator 149 is a display screen.

Figure 2:
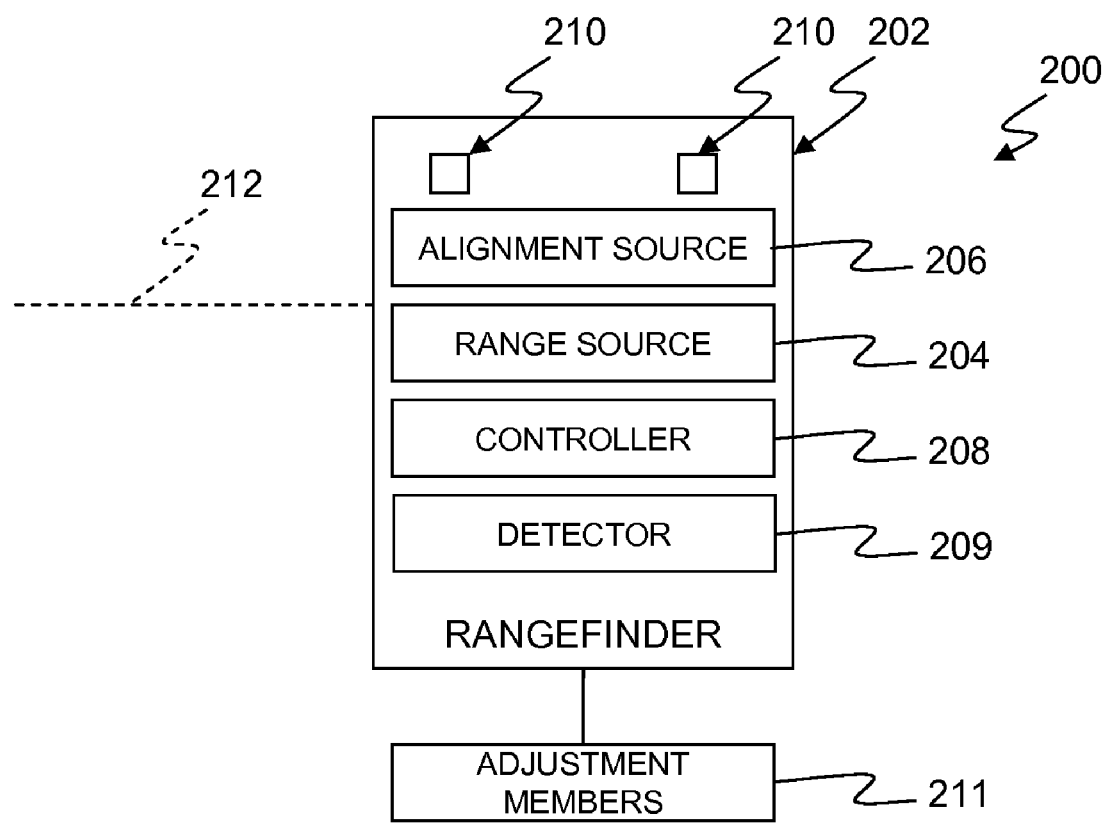
FIG. 2 is a representative view of a laser range finder to be tested with the test station of FIG. 1.

Referring to FIG. 2, an exemplary laser range finder 200 is shown. Laser range finder 200 includes a housing 202, a range source 204, an alignment source 206, a controller 208, and locators 210. Range source 204 and alignment source 206 are aligned to each other so that they each provide an optical signal outside of housing 202 along an optical axis 212 of laser range finder 200. In this way alignment source 206 may be at a first wavelength which is detectable by eyepiece 112 while range source 204 may be at a second wavelength which differs from the first wavelength. In one embodiment, alignment source 206 is a light emitting diode ("LED") which emits light in the visible spectrum and range source 204 is a laser which emits light in the infrared spectrum.

The direction of the optical axis 212 may be adjusted through a plurality of adjustment members 211 which orient the optical assembly including alignment source 206 and range source 204. As such, alignment source 206 and range source 204 remain aligned and the direction of optical axis 211 may be altered. In the case of a BELRF, the adjustment members 211 are the Boresight Mirror Assembly Flex Cables which alter the direction of the optical axis on which the alignment source and the range source are propagated outside of the BELRF.

Controller 208 controls the operation of range source 204 and alignment source 206. To determine the range to a target, controller 208 emits light with range source 204 and senses that light reflected back to a detector 209 within housing 202. In one embodiment, range to the reflective target is estimated based on the elapsed time from the emission of light from range source 204 to the detection of light by detector 209. In one embodiment, the intensity of the light received by detector 209 is also used to estimate the range to the target. The detector 209 being responsive to the wavelength of range source 204.

As mentioned herein, often laser range finders 200 are repaired. Once repaired, the accuracy of the laser range finder 200 in determining a distance to a range target 170 needs to be tested. Test station 100 may be used to test the accuracy of a laser range finder.

Laser range finder 200 is coupled to test station 100. Locators 210 (see FIG. 2) of laser range finder 200 are aligned with locators 108 (see FIG. 1) of holder 106. In one embodiment, locators 108 are pins and locators 210 are openings sized to receive the pins. In one embodiment, laser range finder 200 is further secured to holder 106 by clamps, fasteners, or other suitable couplers.

Figure 4:
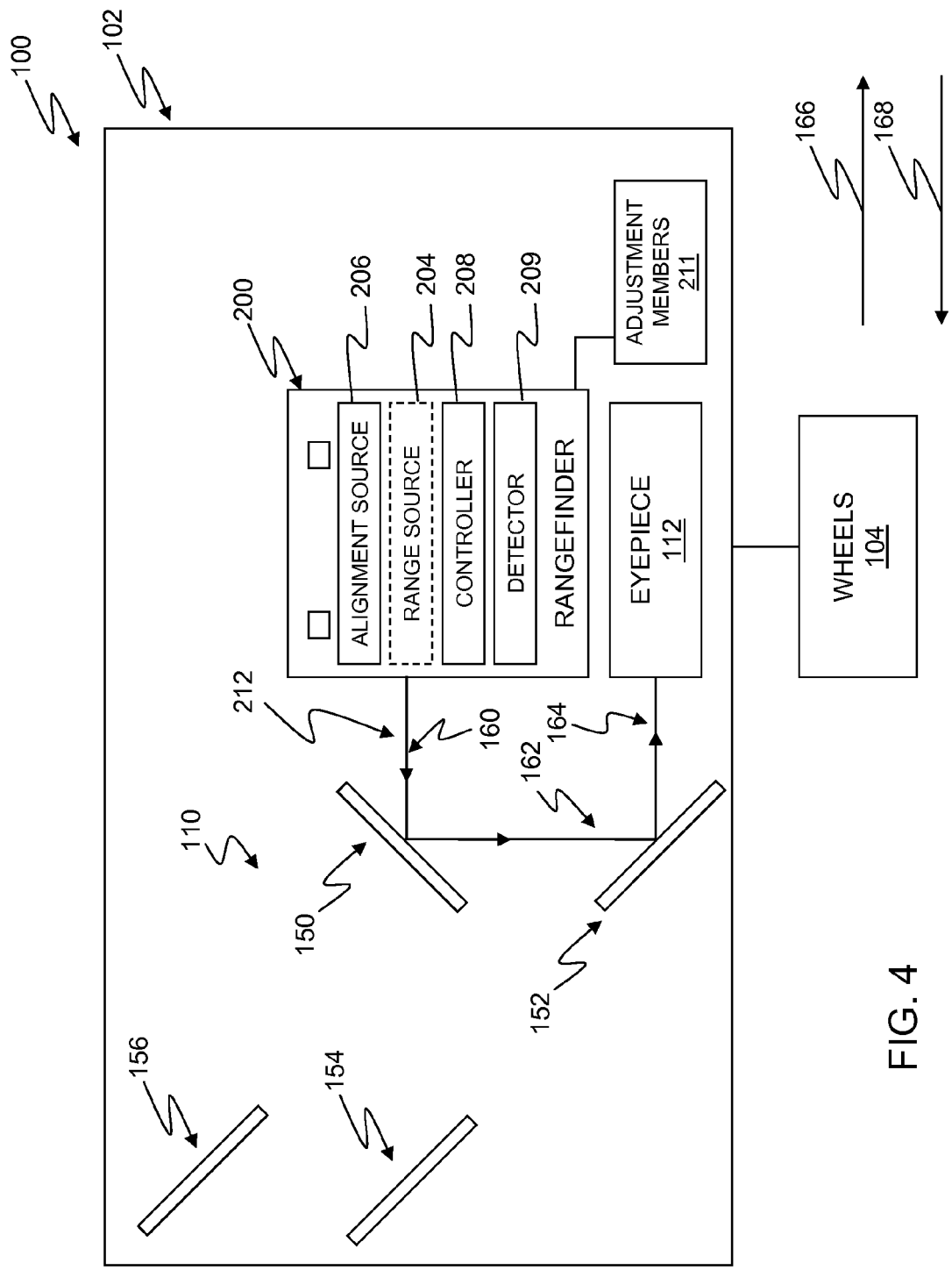
FIG. 4 is a representative view of the laser range finder of FIG. 2 supported by the test station of FIG. 1 wherein an alignment source of the laser range finder of FIG. 2 is being aligned with an eyepiece of the test station of FIG. 1 through an optical system of the test station.

Turning to FIG. 4, laser range finder 200 has been assembled to holder 106. Further, optical system 110 has been setup to align alignment source 206 of laser range finder 200 with eyepiece 112. As shown in the illustrative embodiment, optical system 110 includes a plurality of front surface mirrors including mirror 150, mirror 152, mirror 154, and mirror 156. Each of mirrors 150-156 are generally planar mirrors. As such, optical system 110 is a generally zero power optical system. In one embodiment, refractive optics may supplement mirrors 150-156 or replace one or more of mirrors 150-156. In one example, mirror 150 is replaced with a beam splitter. However, in situations wherein range source 204 and alignment source 206 use distinct wavelengths which are not generally treated equally by refractive optics, reflective optics provide a simpler system.

Mirrors 152, 154, and 156 are supported by frame 102. In one embodiment, each of mirrors 152, 154, and 156 are held by mirror mounts which are coupled to frame 102 and permit the adjustment of the orientation of the respective mirror. In one example, mirrors 152, 154, and 156 are coupled to mirror mounts which are supported by posts and post holders; the post holders being coupled to a support plate of frame 102. Exemplary mirror mounts, posts and post holders are available from Newport Corporation.

Figure 6:
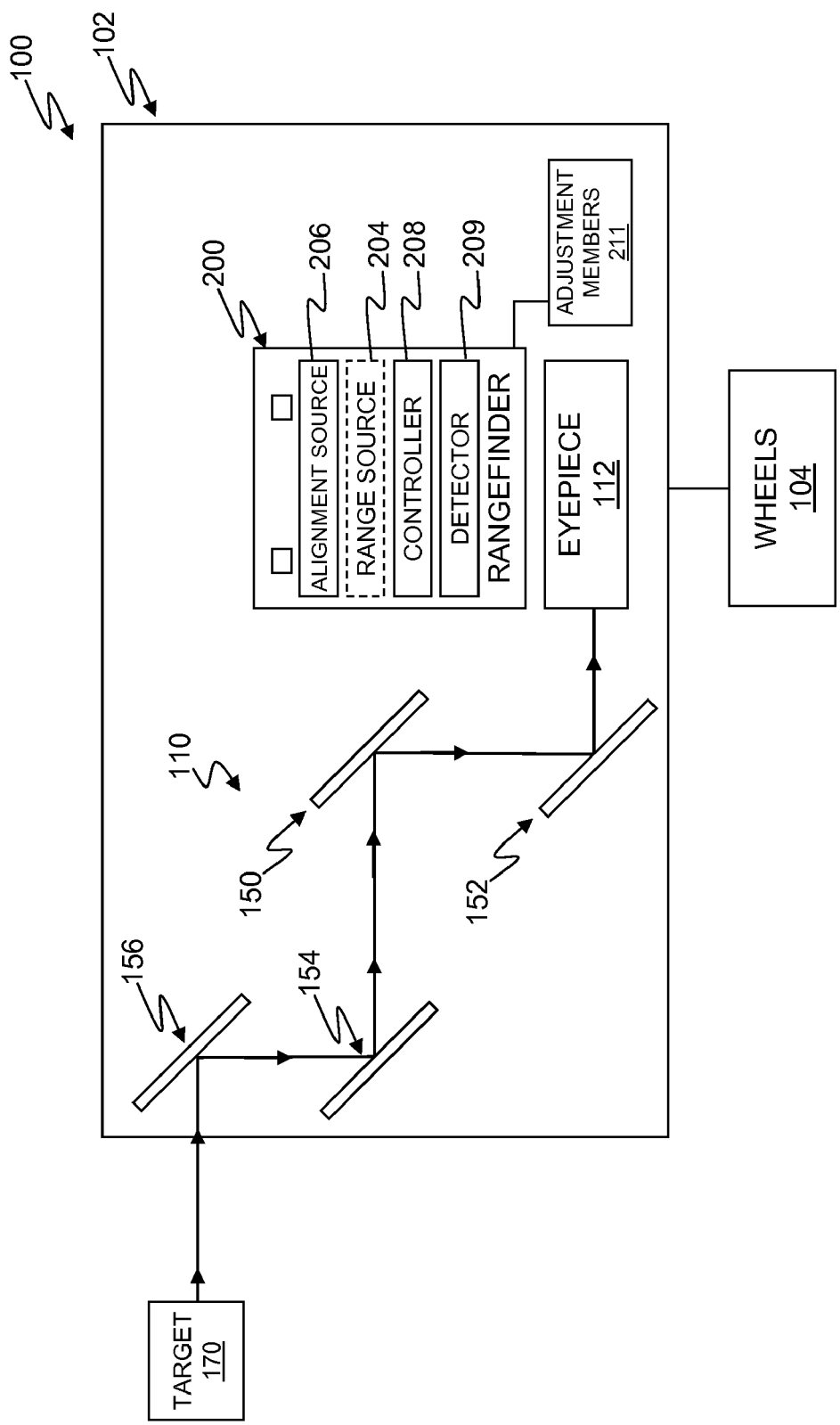
FIG. 6 is a representative view of the eyepiece of the test station being aligned with a range target through the optical system of the test station.
Figure 8:
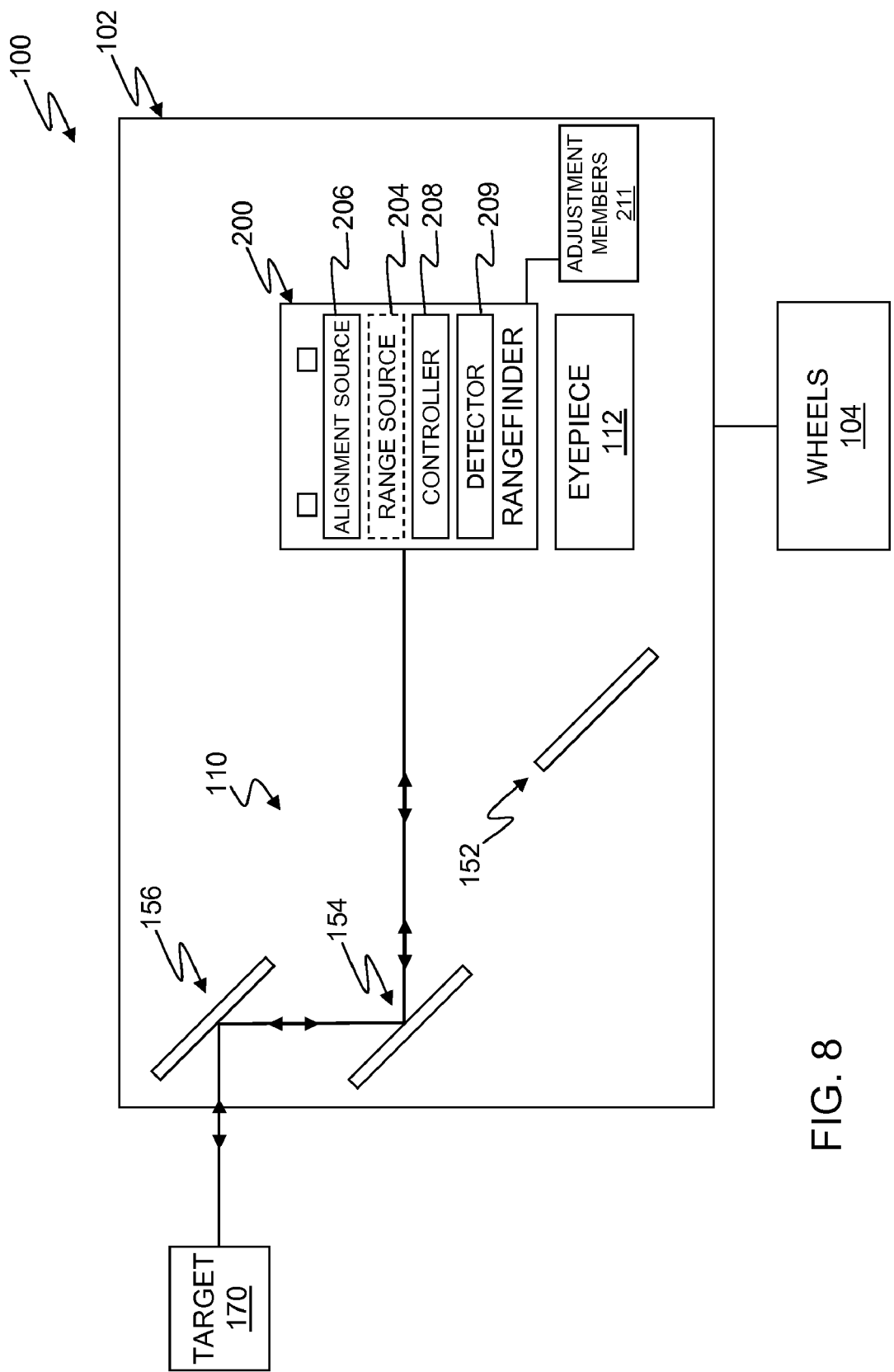
FIG. 8 illustrates the alignment of a range source of the laser range finder with the range target through the optical system of the test station.

Mirror 150 is also supported by a mirror mount which is coupled to frame 102. Mirror 150, as explained herein, has a first rotational position when laser range finder 200 is being aligned to the eyepiece as shown in FIG. 4, a second rotational position when a range target 170 is being aligned to eyepiece 112 as shown in FIG. 6, and is moved out of position when the range target 170 is being aligned to the laser range finder 200 as shown in FIG. 8.

Figure 9:
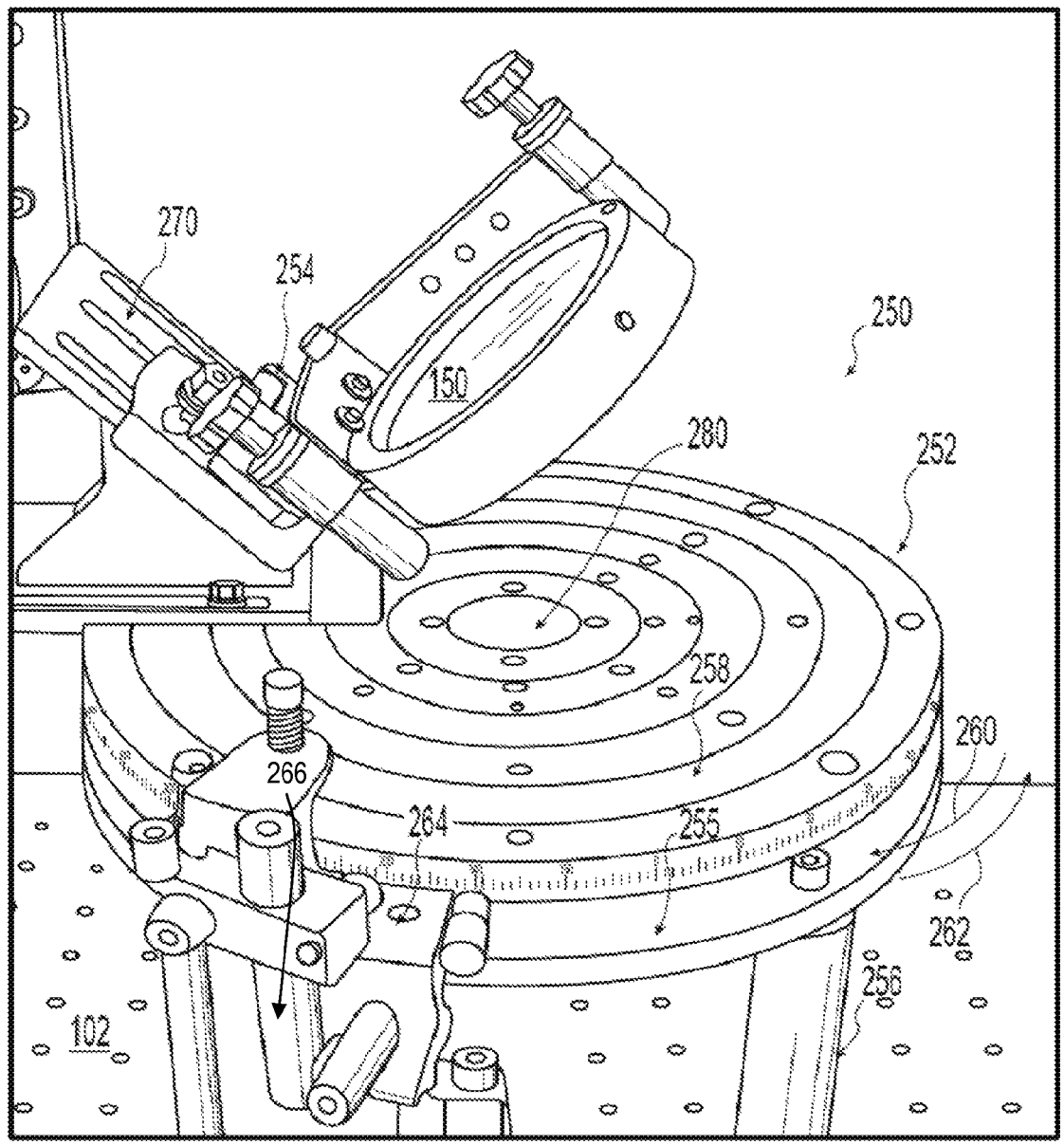
FIG. 9 illustrates an exemplary rotational mount and flip mount for a mirror of the optical system of the test station of FIG. 1.
Figure 10:
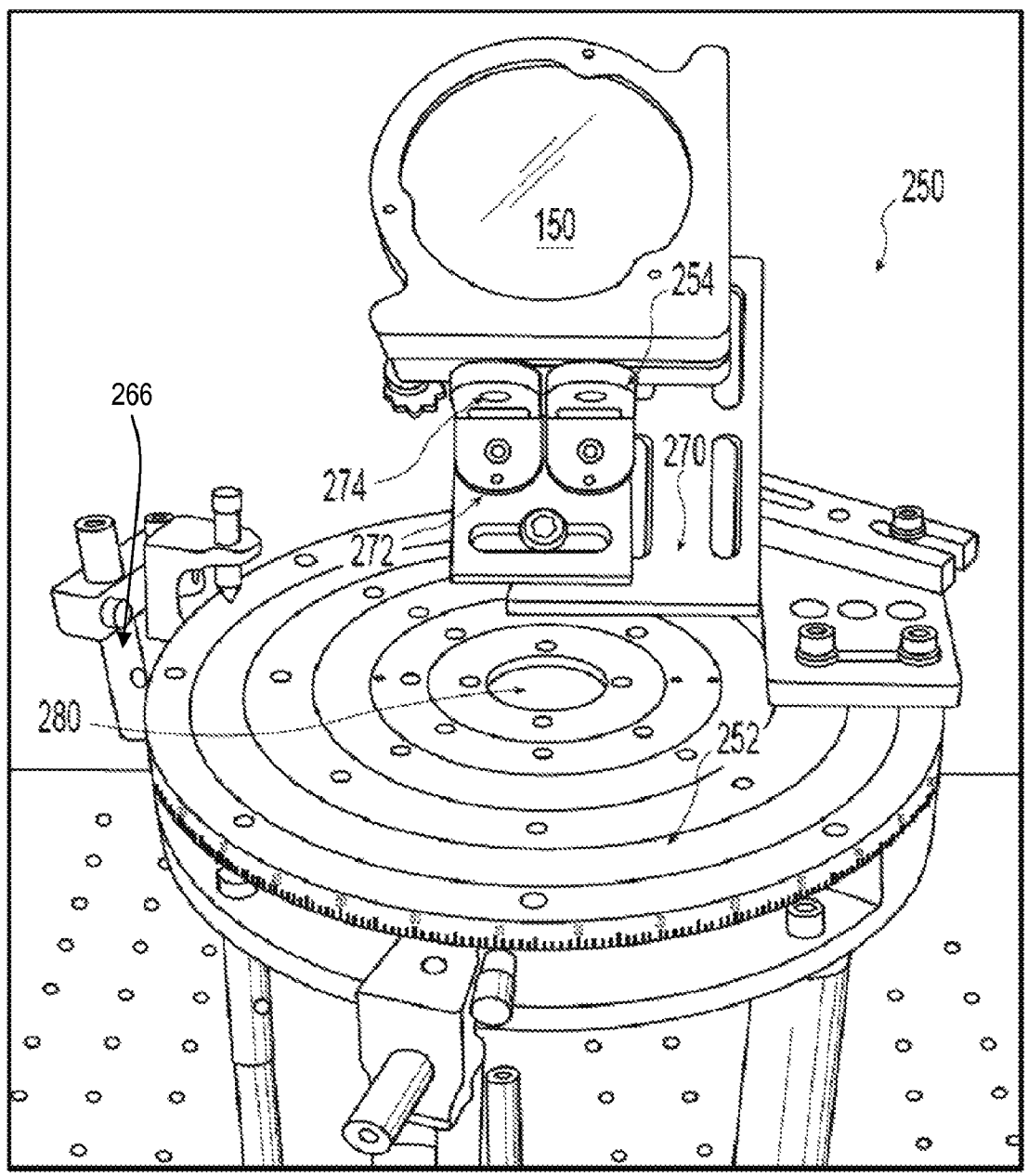
FIG. 10 illustrates another view of the exemplary rotational mount and flip mount of FIG. 9.

Referring to FIGS. 9 and 10, an exemplary mirror mount 250 for mirror 150 is shown. Mirror mount 250 includes a rotational mount 252 and a flip mount 254. Rotational mount 252 includes a lower portion 255 coupled to frame 102 through a plurality of posts 256 and an upper portion 258 which is rotatable relative to lower portion 254 in directions 260 and 262. A stop feature 264 interacts with a pin 266 extending from upper portion 258 to limit the rotation of upper portion 258 in direction 260. This limit position in direction 260 provides a first position for mirror 150, such as the position shown in FIG. 4. In a similar fashion another stop feature (not shown) interacts with pin 266 to limit the rotation of upper portion 258 in direction 262. This limit position in direction 262 provides a second position for mirror 150, such as the position shown in FIG. 6. The second position in FIG. 6 is 180 degrees from the first position in FIG. 4.

Flip mount 254 is coupled to an angle base 270 which is coupled to rotational mount 252. Referring to FIG. 10, flip mount 254 includes a pair of lower portions 272 which are rotationally coupled to a pair of upper portions 274. Upper portions 274 rest on lower portions 272 when in the position shown in FIG. 9. This position corresponds to the position of mirror 150 in FIGS. 4 and 6. Upper portions 274 are rotated generally 90 degrees relative to lower portions 272 in FIG. 10. This position corresponds to FIG. 8 wherein mirror 150 is removed from the optical system.

Returning to FIG. 4, as stated herein, range source 204 is aligned with alignment source 206 so that both emit light along optical axis 212. As shown in FIG. 4, alignment source 206 is active and is emitting a beam of light 160 which encounters mirror 150 and is reflected as beam of light 162. Beam of light 162 encounters mirror 152 and is reflected as beam of light 164. Beam of light 164 encounters eyepiece 112.

Figure 5A:
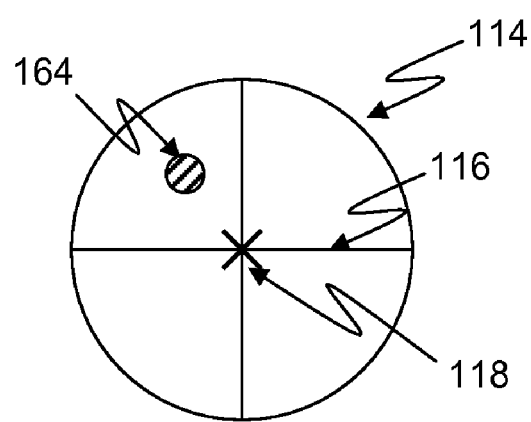
FIG. 5A illustrates an exemplary reticule of the eyepiece of the test station of FIG. 1 and the position of the alignment source of the laser range finder wherein the alignment source is misaligned relative to eyepiece.
Figure 5B:
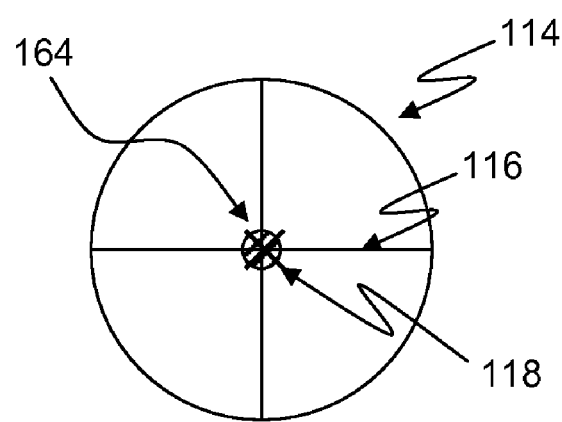
FIG. 5B illustrates the position of the alignment source of the laser range finder when the alignment source is aligned relative to the eyepiece.

In one embodiment, eyepiece 112 is reticle 114. Referring to FIG. 5A, light 164 is shown relative to reticle 114. As shown in FIG. 5A, light 164 is misaligned relative to reticle 114 and optical axis 118. The location of light 164 relative to optical axis 118 may be altered by adjusting optical axis 212 through adjustment members 211 of laser range finder 200. Once light 164 is aligned with optical axis 118, alignment source 206 is aligned with reticle 114. Since alignment source 206 is already assumed to be aligned with range source 204, then range source 204 is also aligned with reticle 114. As shown in FIG. 5B, light 164 is aligned with optical axis 118.

Figure 7A:
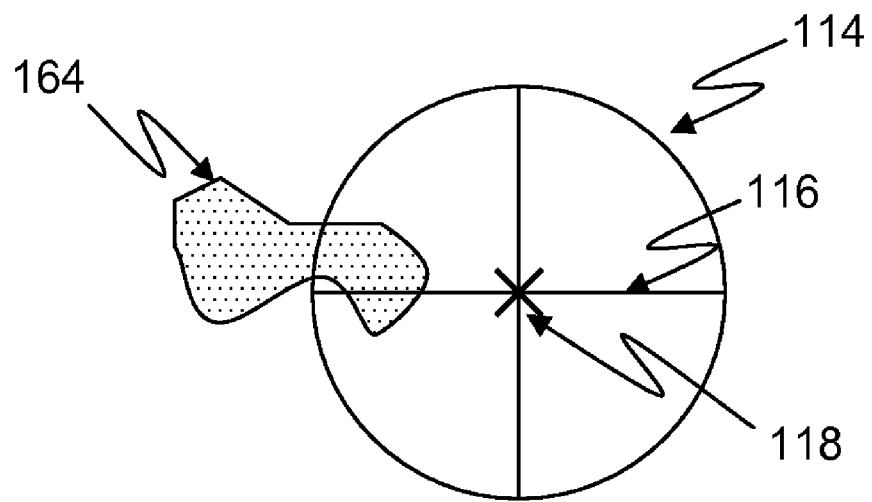
FIG. 7A illustrates the exemplary reticule of the eyepiece of the test station of FIG. 1 and the position of the range target wherein the range target is misaligned relative to eyepiece.
Figure 7B:
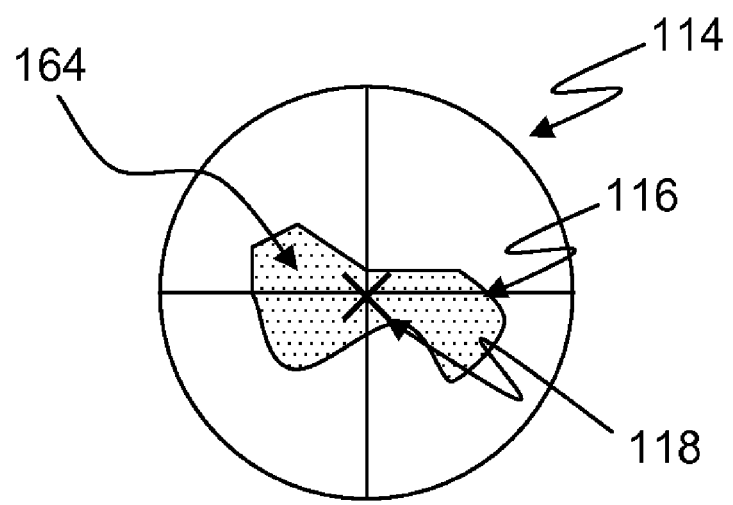
FIG. 7B illustrates the position of the range target when the range target is aligned relative to the eyepiece.

Referring to FIG. 6, optical system 110 is configured to align a range target 170 to eyepiece 112. Mirror 150 is rotated 180 degrees. Range target 170 is aligned to eyepiece 112 by adjusting mirror 156. Referring to FIG. 7A, range target 170 is misaligned relative to optical axis 118 of reticle 114. By adjusting mirror 156, range target 170 may be aligned to optical axis 118, as shown in FIG. 7B.

Referring to FIG. 8, mirror 150 is moved out of the way of laser range finder 200. Since alignment source 206 was already aligned with reticle 114, mirrors 154 and 156 are already set so that alignment source 206 is aligned with range target 170. Therefore, range source 204 is also aligned with range target 170. Controller 208 then controls range source 204 to determine a distance to range target 170.

In one embodiment, frame 102 is moved and the alignment process of FIG. 6 is carried out again to align reticle 114 to a second range target. The laser range finder 200 is then tested to determine the range to the second range target. This process may be repeated for multiple range targets.

In one embodiment, laser range finder 200 is the BELRF unit for the ISU of the Bradley fighting vehicle. The BELRF unit may be assembled into the ISU, the ISU positioned for testing, and the BELRF tested in approximately 66 minutes. By contrast, the BELRF unit may be assembled into test station 100, test station 100 positioned for testing, and the BELRF tested in approximately 42 minutes. This results is an expected savings of about 36 percent. For each subsequent BELRF to be tested with the ISU an additional 23.5 minutes is expected to be required. For each subsequent BELRF to be tested with test station 100 an additional 10 minutes is expected to be required. Based on these assumptions, the following table shows the expected time savings by using test station 100 instead of the traditional ISU.

TABLE I

Comparison of Traditional ISU and Testing Station

| Number of Laser Range Finders | Time with Traditional ISU (min) | Time with Testing Station (min) | Percentage of Time Savings |
| --- | --- | --- | --- |
| 1 | 66 | 42 | 36% |
| 2 | 89.5 | 52 | 42% |
| 3 | 113 | 62 | 45% |
| 4 | 136.5 | 72 | 47% |
| 5 | 160 | 82 | 49% |
| 6 | 183.5 | 92 | 50% |
| 7 | 207 | 102 | 51% |
| 8 | 230.5 | 112 | 51% |
| 9 | 254 | 122 | 52% |
| 10 | 277.5 | 132 | 52% |

Figure 11:
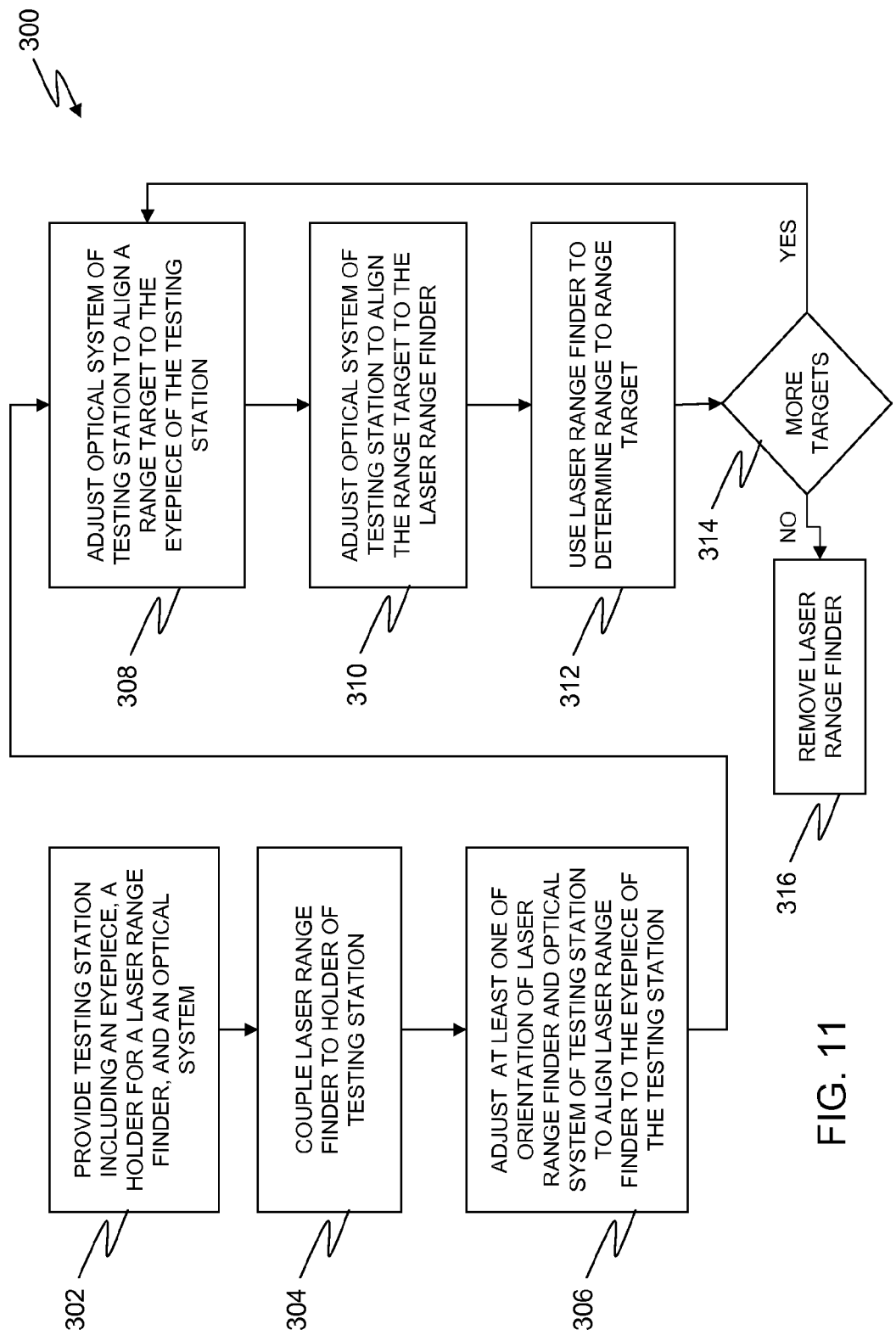
FIG. 11 is an exemplary method for testing a laser range finder with the test station of FIG. 1.

Referring to FIG. 11, an exemplary method 300 of using test station 100 for testing a laser range finder 200 is shown. A test station including an eyepiece, a holder for the laser range finder, and an optical system is provided, as represented by block 302. The laser range finder 200 is coupled to the holder of the testing station, as represented by block 304. At least one of the orientation of the laser range finder and the optical system of the test station is adjusted to align the laser range finder to the eyepiece of the testing station, as represented by block 306. The optical system of the test station is adjusted to align a first range target to the eyepiece of the testing station, as represented by block 308. The optical system of the test station is adjusted to align the first range target to the laser range finder, as represented by block 310. The laser range finder is used to determine a range to the first range target, as represented by block 312. If more range targets are to be used, the operations in blocks 308, 310, and 312 are repeated for each range target, as represented by block 314. If no more range targets are to be used, then the laser range finder is removed from the test station, as represented by block 316.

Referring to FIGS. 12-15, an exemplary test station 400 is shown which operates according to the principles disclosed for test station 100. Test station 400 includes mirrors 150, 152, 154, and 156. Mirror 150 is supported on mount 250. Light is able to pass through an opening 280 in mount 250. A laser range finder 402 is coupled to a holder 404. Holder 404 includes a plurality of posts supported on a frame 408. In one embodiment, frame 408 is supported on a rotational mount to assist in the acquisition of multiple range targets during a testing cycle.

Figure 15:
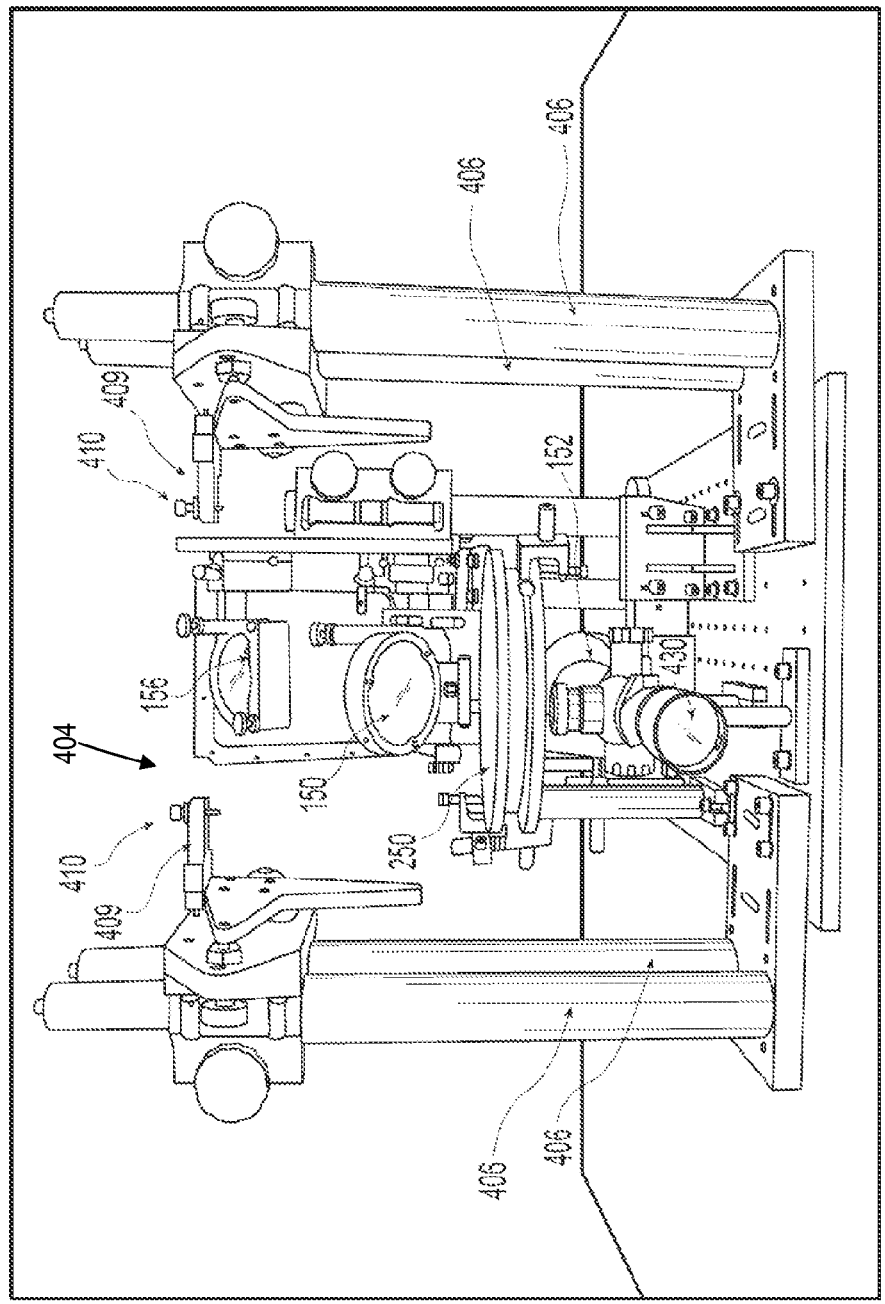
FIG. 15 illustrates an end view of the exemplary test station of FIG. 12.

Referring to FIG. 15, holder 404 includes a pair of adapter plates 409 which have corresponding couplers 410. Couplers 410 retain laser range finder 402 relative to holder 404. Different adapter plates may be used for different types of laser range finders.

Returning to FIG. 12, a shield 420 is provided over holder 404 to prevent an operator from contacting any exposed wires or circuitry on laser range finder 402. Shield 420 includes a central portion 422 and a pair of rotatable windows 424. Windows 424 are transparent and allow the operator to observe laser range finder 402.

Returning to FIG. 12, test station 400 is setup in the configuration represented in FIG. 4. The eyepiece is a rifle scope 430 having a reticule. Light 434 from an alignment source of laser range finder 402 is reflected off of mirror 150 downward to mirror 152 and then off of mirror 152 and into rifle scope 430. In one embodiment, mount 250 includes a first limit switch which provides an indication when mount 250 is in the position shown in FIG. 12. In one example, the signal from the limit switch is provided to a controller which prevents the firing of alignment source 206 unless mount 250 is in the position shown in FIG. 12. In one example, the signal from the second limit switch is provided to an indicator light which is lit when mount 250 is in the position shown in FIG. 12.

Light 434 is directed along an axis 432 in order to be aligned with the reticule of rifle scope 430. Adjustment members 440 of laser range finder 402 are manipulated to make light 434 align with axis 432.

Figure 13:
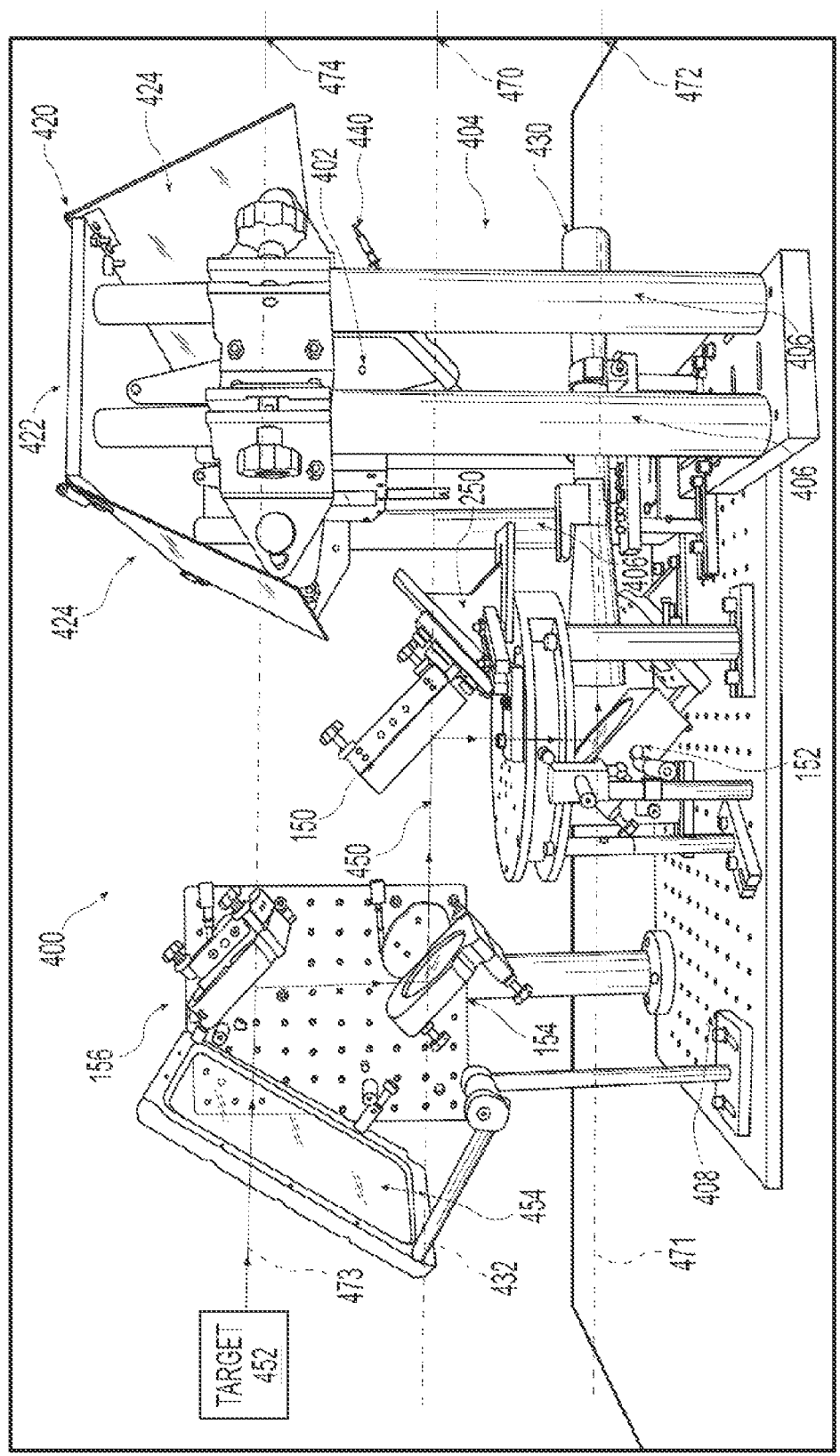
FIG. 13 illustrates a side view of the test station of FIG. 12 and a second portion of the optical system which aligns the eyepiece with the first range target which is spaced apart from the test station, the second portion including the mounts of FIG. 9.

Referring to FIG. 13, mount 250 is rotated 180 degrees and test station 400 is setup in the configuration represented in FIG. 6. Light 450 from a range target 452 is received through a window 454. Window 454, in one embodiment, approximates the optical characteristics of a window on the vehicle or apparatus that laser range finder 402 is used with in the field. In one example, window 454 has about a 30 percent transmission loss for the wavelength of range source 204.

Figure 12:
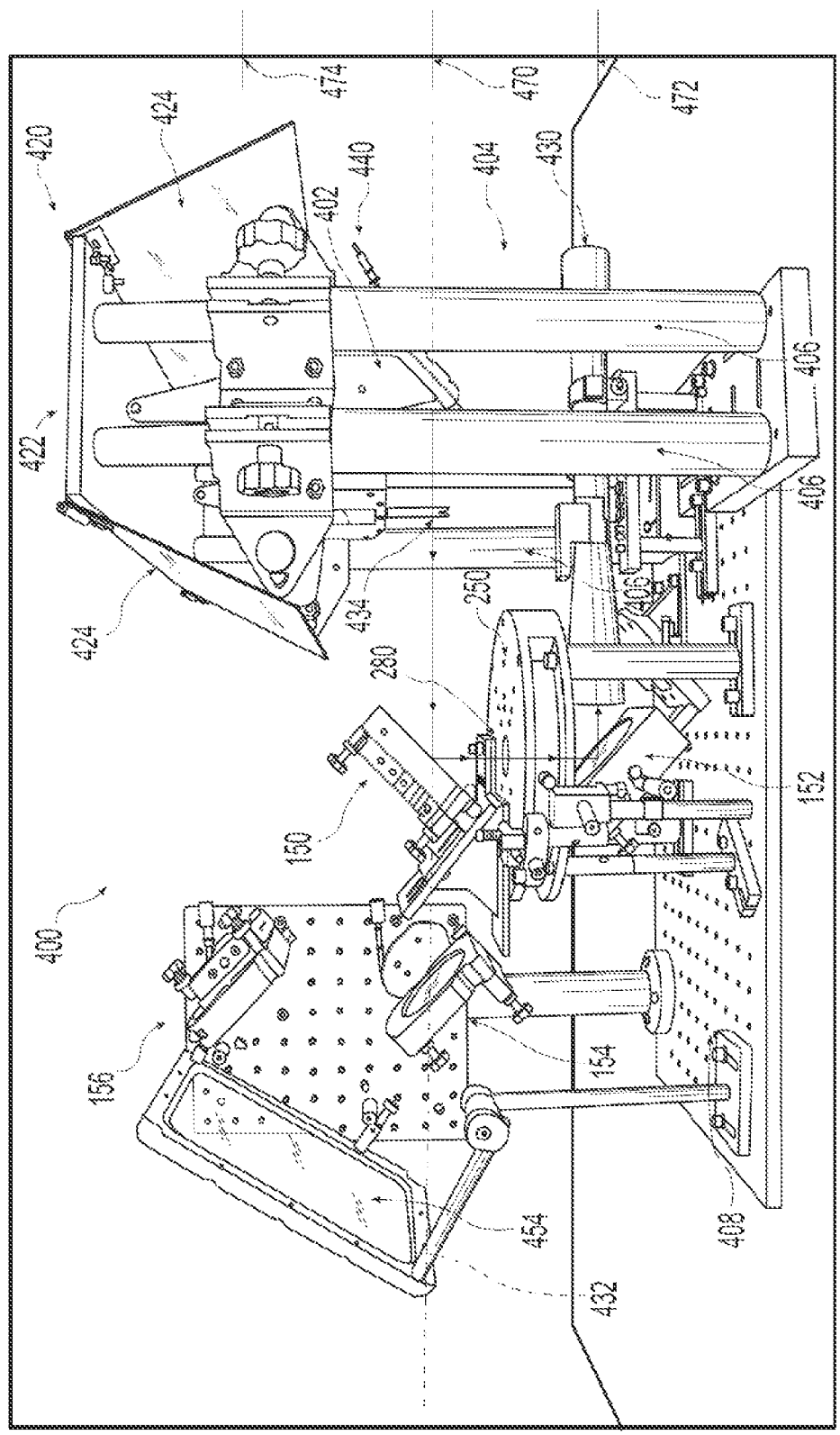
FIG. 12 illustrates a side view of an exemplary test station including a frame, a holder supported by the frame and supporting a laser range finder being tested, an eyepiece supported by the frame, and an optical system supported by the frame, the optical system including a first portion which aligns the eyepiece with the alignment source of the laser range finder, the first portion including the mounts of FIG. 9.
Figure 14:
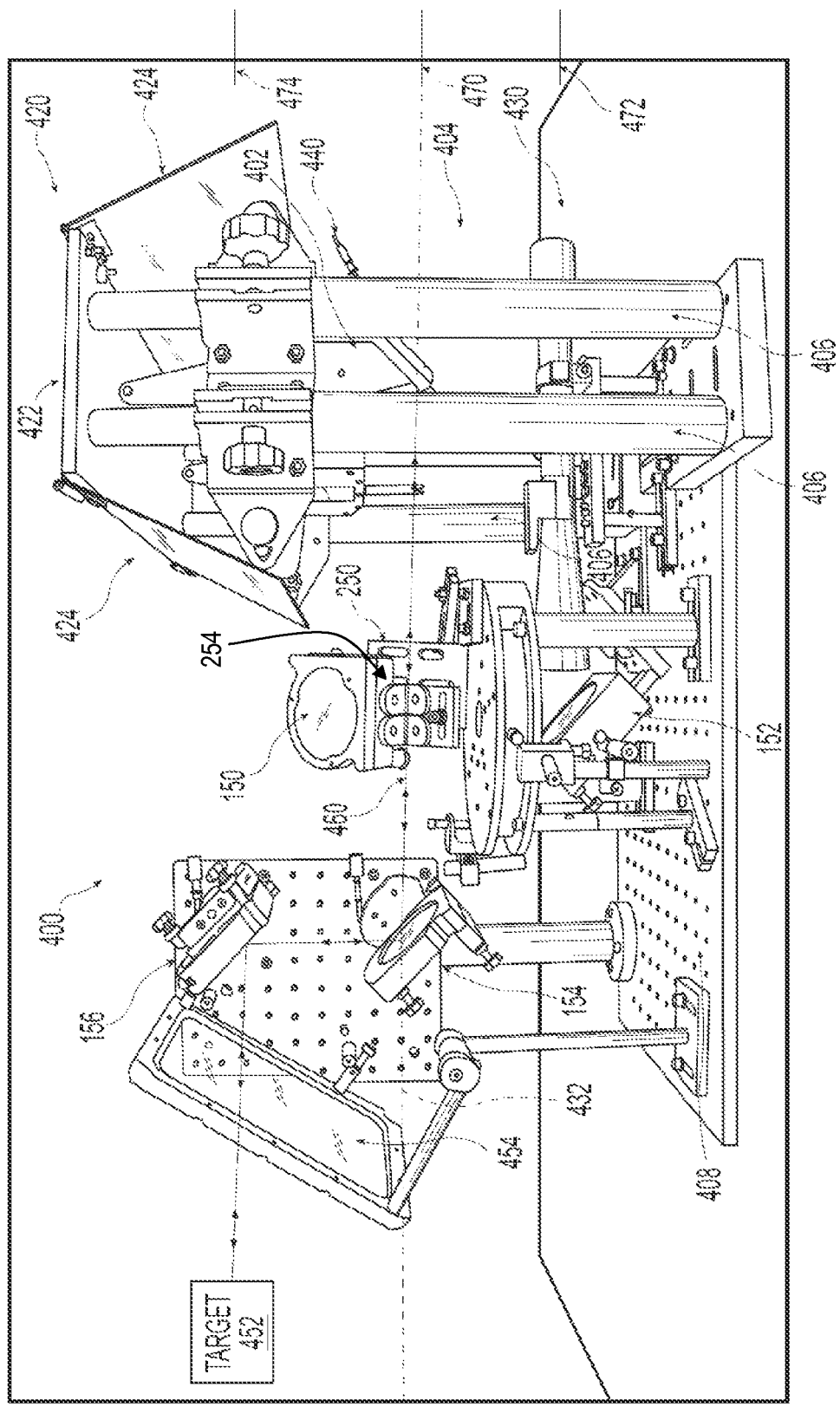
FIG. 14 illustrates a side view of the test station of FIG. 12 and a third portion of the optical system which aligns the range source of the laser range finder with the first range target, the third portion including the mounts of FIG. 9.

Referring to FIG. 14, mount 250 is rotated 90 degrees to a position between those shown in FIG. 12 and FIG. 13. Mirror 150 is flipped out of alignment with axis 432 and test station 400 is setup in the configuration represented in FIG. 8. Light 460 is provided by a range source of laser range finder 402, is reflected by range target 452, and enters through window 454. The reflected light is detected by laser range finder 402 and a distance to range target 452 is determined. In one embodiment, mount 250 includes a second limit switch which provides an indication when flip mounts 254 of mount 250 are in the position shown in FIG. 10. In one example, the signal from the second limit switch is provided to a controller which prevents the firing of range source 204 unless flip mounts 254 of mount 250 is in the position shown in FIG. 14. In one example, the signal from the second limit switch is provided to an indicator light which is lit when flip mounts 254 of mount 250 is in the position shown in FIG. 14.

Returning to FIG. 13, axis 432 is contained within a first horizontal plane 470 extending out of the page. A second horizontal plane 472 is parallel to the first horizontal plane 470 and includes the horizontal axis 471 of the reticule of rifle scope 430. A third horizontal plane 474 is parallel to first horizontal plane 470 and includes the range target 452 along an axis 473. In one example the third horizontal plane 474 is angled relative to first horizontal plane 470. In one embodiment, axes 432, 471, and 473 are parallel. In one embodiment, axes 432, 471, and 473 are each contained within a vertical plane perpendicular to first horizontal plane 470.

In the illustrated embodiment of FIGS. 9, 10, 12-15, the positions of mirrors 150, 152, 154, and 156 are manually adjusted. In one embodiment, sensors are included to sense the position of each mirror, or at least mirrors 150 and 156, and controllers are included to position the mirrors based on the input from the sensors.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A test station for testing an ability of a laser range finder to determine a distance to a first range target, the test station comprising:
   a frame;
   a holder supported by the frame, the holder supporting a laser range finder being tested, the laser range finder having an alignment source and a range source aligned to the alignment source;
   an eyepiece supported by the frame; and
   an optical system supported by the frame, the optical system including a first reference plane in which the alignment source and the range source are aligned to a first axis, a second reference plane in which the eyepiece is centered on a second axis contained in the second reference plane, and a third reference plane which intersects the first range target along a third axis contained in the third reference plane, the optical system including a first portion which receives light from the alignment source of the laser range finder along the first axis and redirects it from the first reference plane to the eyepiece along the second axis in the second reference plane, a second portion which receives light from the first range target along the third axis in the third reference plane and redirects it to the eyepiece along the second axis in the second reference plane; and a third portion which aligns the range source of the laser range finder along the first axis with the first range target along the third axis.

2. The test station of claim 1, wherein the first axis, the second axis, and the third axis are parallel.

3. The test station of claim 1, wherein the holder includes an adapter plate which supports the laser range finder being tested.

4. A test station for testing an ability of a laser range finder to determine a distance to a first range target, the test station comprising:
   a frame;
   a holder supported by the frame, the holder supporting a laser range finder being tested, the laser range finder having an alignment source and a range source aligned to the alignment source;
   an eyepiece supported by the frame; and an optical system supported by the frame, the optical system including a first portion which aligns the eyepiece with the alignment source of the laser range finder; a second portion which aligns the eyepiece with the first range target which is spaced apart from the test station; and a third portion which aligns the range source of the laser range finder with the first range target.

5. The test station of claim 4, wherein the optical system includes a first mirror, the first mirror being included in the first portion and in the second portion.

6. The test station of claim 5, wherein the first mirror is supported by a rotational stand and is in a first position when included in the first portion and is in a second position when included in the second portion, the first mirror being moveable from the first position to the second position through a rotation of the rotational stand.

7. The test station of claim 6, wherein the first mirror is further supported by a flip mount, the flip mount being in a first position to include the first mirror in one of the first portion and the second portion and in a second position to exclude the first mirror from the third portion.

8. The test station of claim 4, wherein the optical system includes a plurality of mirrors, a first group of the plurality of mirrors corresponding to the first portion of the optical system, a second group of the plurality of mirrors corresponding to the second portion of the optical system, a third group of the plurality of mirrors corresponding to the third portion of the optical system.

9. The test station of claim 8, wherein the first group of the plurality of mirrors and the second group of the plurality of mirrors have at least one mirror in common.

10. The test station of claim 9, wherein the first group of the plurality of mirrors are a subset of the second group of the plurality of mirrors.

11. The test station of claim 9, wherein the first group of the plurality of mirrors and the third group of the plurality of mirrors are distinct.

12. The test station of claim 8, wherein the first group of the plurality of mirrors and the third group of the plurality of mirrors are each a respective subset of the second group of the plurality of mirrors and are distinct from each other.

13. A method of testing a laser range finder, the method comprising the steps of:
receiving a laser range finder, the laser range finder including an alignment source and a range source, the alignment source and the range source being aligned;
aligning the alignment source of the laser range finder to an eyepiece provided on a test station through a first portion of an optical system of the test station, thereby aligning the eyepiece to the range source of the laser range finder;
aligning the eyepiece to a first range target spaced apart from the test station through a second portion of the optical system of the testing station;
aligning the laser range finder to the first range target through a third portion of the optical system of the test station; and
determining a distance from the laser range finder to the first range target with the range source.

14. The method of claim 13, further comprising the steps of providing a holder for receiving the laser range finder and positioning the laser range finder to be supported by the holder.

15. The method of claim 14, wherein the step of positioning the laser range finder to be supported by the holder includes the step of aligning locators of the laser range finder with locators of the holder.

16. The method of claim 13, wherein the alignment source of the laser range finder and the range source of the laser range finder are aligned to a laser range finder optical axis and wherein the step of aligning the alignment source of the laser range finder to an eyepiece provided on a test station with a first portion of an optical system of the test station includes the step of adjusting an orientation of the laser range finder optical axis.

17. The method of claim 13, wherein the optical system of the test station includes a plurality of mirrors, a first group of the plurality of mirrors corresponding to the first portion, a second group of the plurality of mirrors corresponding to the second portion, a third group of the plurality of mirrors corresponding to the third portion.

18. The method of claim 17, wherein the step of aligning the eyepiece to a first range target spaced apart from the test station with a second portion of the optical system of the test station includes the step of adjusting an orientation of a first mirror of the second portion of the optical system, wherein the first mirror is included in both the second portion of the optical system and the third portion of the optical system.

19. A method of testing a laser range finder, the method comprising the steps of:
(a) receiving a laser range finder, the laser range finder including an alignment source and a range source, the alignment source and the range source being aligned;
(b) providing a test station including a frame, an eyepiece, a holder which supports the laser range finder, a first mirror, a second mirror, a third mirror, and a fourth mirror;
(c) aligning the alignment source of the laser range finder to the eyepiece through the first mirror and the second mirror;
(d) aligning the eyepiece to a first range target spaced apart from the test station with the first mirror, the second mirror, the third mirror, and the fourth mirror;
(e) aligning the laser range finder to the first range target with the third mirror and the fourth mirror; and
(f) determining a distance from the laser range finder to the first range target with the range source.

20. The method of claim 19, wherein the second mirror is supported on a rotational mount and is at a first rotary position during step (c) and is at a second rotary position during step (d).

21. The method of claim 19, wherein the second mirror is further supported on a flip mount and is in a first position during steps (c) and (d) and is in a second position during step (e).

22. The method of claim 19 wherein steps (a) through (f) are performed sequentially.

23. The method of claim 19, further comprising the step positioning the laser range finder to be supported by the holder, wherein the step of positioning the laser range finder to be supported by the holder includes the step of aligning locators of the laser range finder with locators of the holder.

* * * * *